(12) United States Patent
Washington

(10) Patent No.: US 8,570,543 B2
(45) Date of Patent: Oct. 29, 2013

(54) DEVICE AND METHOD FOR IMPROVING XEROGRAPHIC VOLTAGE UNIFORMITY FOR AN IMAGE RECORDING APPARATUS

(75) Inventor: John R. Washington, Hitchin (GB)

(73) Assignee: Xerox Corporation, Norwalk, CT (US)

( * ) Notice: Subject to any disclaimer, the term of this patent is extended or adjusted under 35 U.S.C. 154(b) by 291 days.

(21) Appl. No.: 13/028,703

(22) Filed: Feb. 16, 2011

(65) Prior Publication Data
US 2012/0206738 A1    Aug. 16, 2012

(51) Int. Cl.
*G06F 3/12*     (2006.01)
*H01J 1/62*     (2006.01)

(52) U.S. Cl.
USPC ............ 358/1.13; 358/1.9; 358/474; 358/1.7; 347/19; 347/130; 347/237; 347/238; 313/500; 399/4

(58) Field of Classification Search
USPC ............ 347/236, 237, 238, 239, 19; 313/500; 358/1.7, 1.9, 1.13, 296, 474
See application file for complete search history.

(56) References Cited

U.S. PATENT DOCUMENTS

| | | | |
|---|---|---|---|
| 4,727,428 A * | 2/1988 | Futatsugi et al. | 358/296 |
| 4,967,211 A * | 10/1990 | Colby et al. | 347/131 |
| 5,016,027 A * | 5/1991 | Uebbing | 347/236 |
| 5,586,055 A * | 12/1996 | Ng et al. | 702/90 |
| 5,666,150 A * | 9/1997 | Ajewole | 347/240 |
| 5,668,587 A * | 9/1997 | Hammond et al. | 347/237 |
| 5,917,535 A * | 6/1999 | Corona | 347/238 |
| 6,223,006 B1 * | 4/2001 | Scheuer et al. | 399/48 |
| 6,554,388 B1 * | 4/2003 | Wong et al. | 347/19 |
| 6,982,813 B2 * | 1/2006 | Hirata et al. | 358/1.9 |
| 7,253,828 B2 * | 8/2007 | Ng et al. | 347/236 |
| 7,649,638 B2 * | 1/2010 | Beard et al. | 358/1.13 |
| 2003/0007062 A1* | 1/2003 | Wong et al. | 347/236 |
| 2003/0116694 A1* | 6/2003 | Maeda | 250/205 |
| 2003/0117484 A1* | 6/2003 | Vazan | 347/236 |
| 2004/0100552 A1* | 5/2004 | Taira et al. | 347/236 |
| 2004/0183457 A1* | 9/2004 | Kondo et al. | 315/169.3 |
| 2004/0183886 A1* | 9/2004 | Regelsberger et al. | 347/130 |
| 2006/0023017 A1* | 2/2006 | Ng et al. | 347/19 |
| 2012/0140014 A1* | 6/2012 | Hosier | 347/236 |

* cited by examiner

*Primary Examiner* — Twyler Haskins
*Assistant Examiner* — Dennis Dicker
(74) *Attorney, Agent, or Firm* — Simpson & Simpson, PLLC

(57) ABSTRACT

An image recording apparatus including a memory element and a processor for a specially programmed general purpose computer. The memory element stores correction data for a plurality of locations on a photoreceptor for the image recording apparatus. The processor is for: inducing a charge on the photoconductive layer; receiving image data including, for said each location in the plurality of locations, a first or second desired voltage level; calculating, using the correction and image data, respective desired output power levels for a LED printbar for the apparatus, aligned with the plurality of locations, to discharge each location to the one of the first or second desired charge level, the respective desired output power levels selected to compensate for variances of respective induced charge levels at the plurality of locations; and supplying respective power inputs to the plurality of LEDs to generate the respective desired output power levels.

26 Claims, 5 Drawing Sheets

US 8,570,543 B2

DEVICE AND METHOD FOR IMPROVING XEROGRAPHIC VOLTAGE UNIFORMITY FOR AN IMAGE RECORDING APPARATUS

TECHNICAL FIELD

The present disclosure relates to an image recording apparatus with improved voltage uniformity for a photoreceptor, in particular, to an image recording device with control of power inputs to light-emitting diodes (LEDs) in an LED print-head to compensate for charge carrying variances for a photoconductive layer of the photoreceptor.

BACKGROUND

FIG. 1 schematically shows prior art image recording apparatus 100 with light-emitting diode (LED) printbar 101. Printbar 101 is an example of an LED full width array imager. An LED full width array imager consists of an arrangement of a large number of closely spaced LEDs in a linear array. By providing relative motion between the LED printbar and a photoreceptor in a process direction, and by selectively energizing the LEDs at the proper times in a scan direction, a desired latent electrostatic image can be produced on the recording member. The production of a desired latent image is usually performed by having each LED expose a corresponding pixel on the recording member in accordance with image-defining video data information applied to the printbar through driver circuitry. Conventionally, digital data signals from a data source, which may be a Raster Input Scanner (RIS), a computer, a word processor or some other source of digitized image data is clocked into a shift register. Some time after the start of a line signal, individual LED drive circuits are then selectively energized to control the on/off timing of currents flowing through the LEDs. The LEDs selectively turn on and off at fixed intervals to form a line exposure pattern on the surface of the photoreceptor. A complete image is formed by successive line exposures.

The following provides further detail regarding prior art apparatus 100. Printbar 101 includes: LED's controlled according to recording signals supplied from an unrepresented external device; a photoreceptor (in the form of a rotary drum) 102 provided with photoconductive layer 119 along the periphery thereof; a rod lens array 103 for focusing the light beams of the LED's in the printing head 101 onto photoconductive layer 119; a corona charger 104 for charging photoconductive layer 119 in advance; a developing station 105 for developing an electrostatic latent image with toner; a recording sheet 106; a cassette 107 housing a plurality of recording sheets 106; a feed roller 108 for feeding the recording sheet 106 from the cassette 107; registration rollers 109 for matching the front end of the recording sheet with the leading end of the image formed on the drum 102; a transfer charger 110 for transferring the developed image from the drum 102 onto the recording sheet 106; a separating roller 111 for separating the recording sheet from the drum 102; a belt 112 for transporting the recording sheet; fixing rollers 113; discharge rollers 114 for discharging the recording sheet onto a tray 115; a blade cleaner 116 for removing the toner remaining on the drum 102; a container 117 for the recovered toner; and a lamp 118 for eliminating charge remaining on the drum 102.

In general, the LEDs in the printbar are operated so as to discharge respective portions of photoconductive layer 119 such that the respective voltage levels for the portions of the photoreceptor are at a first level corresponding to a print area or at a second level corresponding to a blank area. Toner adheres to the photoreceptor according to the charge remaining on the photoconductive layer. Therefore, the first level is relatively high and the second level is relatively low. The operation of the LEDs assumes that the charge on the photoconductive layer, prior to illumination by the LEDs, is at a uniform specified level, in particular, across the width of the photoreceptor (orthogonal to the direction of movement for the photoreceptor). However, the actual charge on various portions of the photoconductive layer can vary from the specified level due to dimensional variances in the photoconductive layer, misalignment of charger 104, or misalignment of drum 102. Such variances in the actual charge levels result in the LEDs discharging the respective portions of the photoconductive layer at levels other than the first or second level noted above, which results in a degradation of print quality for apparatus 100.

For example, the thickness of photoconductive layer 119 is assumed to be at a specified level. However, the actual thickness of the photoconductive layer, in particular, across the width of the photoreceptor, can vary due to fabrication tolerances. The charge carried by the photoconductive is directly related to the thickness of the photoconductive layer. For a particular charging voltage from charger 104, there is an assumed charge on the photoreceptor in accordance with the assumed specified thickness of the photoconductive layer. However, the actual charge carried by the photoreceptor, in response to the uniform charging voltage, can vary according to the actual thickness of the photoconductive layer, which can vary from the specified thickness as noted above. For example, if the actual thickness of the photoconductive layer varies from the assumed thickness such that the charge on a portion of the photoconductive layer is greater than the assumed charge, the LED printbar will not be able to discharge the portion to the first or second level noted above. In this case, the image for the portion may be undesirably darker than surrounding areas.

Regarding the misalignment of charger 104, for example, the distance of the charger from the photoreceptor can vary across the width of the photoreceptor due to the misplacement of the charger or deformations in the structure of the charger. The amount of charging voltage delivered to the photoreceptor depends on the distance between the charger and the photoreceptor. Therefore, the charge on the photoreceptor can vary as the distance between the charger and the photoreceptor varies. Drum misalignment can cause the distance between photoreceptor and the charger to vary along the length of the photoreceptor (along the direction of movement for the photoreceptor). It should be understood that the discussion above is applicable to image recording apparatus with other photoreceptor configurations, such as a photoreceptor belt. For example, misalignment of one or more drums for a photoreceptor belt can cause the drum alignment problems noted above.

U.S. Pat. No. 6,223,006 describes photoreceptor charge control directed toward photoreceptor variation around a periphery of a photoreceptor due to the manufacturing process for the photoreceptor. This patent fails to address variation in areas of the photoreceptor other than along the periphery, for example, variation across a width of the photoreceptor. This patent also fails to address variation due to alignment of the photoreceptor or components acting on the photoreceptor, such as the charger.

SUMMARY

According to aspects illustrated herein, there is provided a method for improving xerographic voltage uniformity in an image recording apparatus, including: storing, in a memory element for at least one specially programmed general purpose computer, correction data for a plurality of locations on a photoconductive layer of a photoreceptor for the image recording apparatus; inducing a charge, using a processor for the at least one specially programmed general purpose computer, on the photoconductive layer; receiving, using the processor, image data for producing an image using the apparatus, the image data including, for said each location in the plurality of locations, one of a first or second desired voltage level; calculating, using the processor, the correction data, and the image data, respective desired output power levels for a plurality of light emitting diodes (LEDs) in a printbar for the apparatus, aligned with the plurality of locations, to discharge said each location to the one of the first or second desired charge level, the respective desired output power levels selected to compensate for variances of respective induced charge levels at the plurality of locations; and supplying, using the processor, respective power inputs to the plurality of LEDs to generate the respective desired output power levels.

According to aspects illustrated herein, there is provided a method for improving xerographic voltage uniformity in an image recording apparatus, including: storing, in a memory element for at least one specially programmed general purpose computer, correction data for a plurality of locations across a width of a photoconductive layer for a photoreceptor for the image recording apparatus, the correction data including respective variances, with respect to a desired induced charge level, of respective actual induced charge levels; applying, using a processor for the at least one specially programmed general purpose computer, voltage to the photoconductive layer such that the respective actual induced charge levels differ from the desired induced charge level according to the respective variances; receiving, using the processor, image data including respective desired charge levels for the plurality of locations, the respective desired charge levels being one of a second or third charge level; storing, in the memory element, respective output power levels, for a plurality of light emitting diodes (LEDs) in a printbar for the apparatus, the plurality of LEDs aligned with the plurality of locations; determining, using the processor, the stored respective output power levels, and the correction and image data, that the respective output power levels for the plurality of LEDs are insufficient to discharge the plurality of locations to be within a first range of the second desired charge level or to be within a second range of the third desired charge level; and modifying, using the processor and the correction and image data, power supplied to the plurality of LEDs such that the respective output power levels of the plurality of LEDs are sufficient to discharge the plurality of locations to be within the first range of the second desired charge level or to be within the second range of the third desired charge level.

According to aspects illustrated herein, there is provided a method for improving xerographic voltage uniformity using a module installable in and removable from an image recording apparatus, including: storing, in a memory element for the module, correction data for a plurality of locations on a photoconductive layer of a photoreceptor included in the module; installing the module in the image recording apparatus; inducing a charge, using a processor for at least one specially programmed general purpose computer, on the photoconductive layer; receiving, using the processor, image data for producing an image using the apparatus, the image data including, for said each location in the plurality of locations, one of a first or second desired voltage level; calculating, using the processor, the correction data, and the image data, respective desired output power levels for a plurality of light emitting diodes (LEDs) in a printbar for the apparatus, aligned with the plurality of locations, to discharge said each location to the one of the first or second desired charge level, the respective desired output power levels selected to compensate for variances of respective induced charge levels at the plurality of locations; and supplying, using the processor, respective power inputs to the plurality of LEDs to generate the respective desired output power levels.

According to aspects illustrated herein, there is provided an image recording apparatus with improved xerographic voltage uniformity, including a memory element and a processor for at least one specially programmed general purpose computer. The memory element is for storing correction data for a plurality of locations on a photoconductive layer of a photoreceptor for the image recording apparatus. The processor is for: inducing a charge on the photoconductive layer; receiving image data for producing an image using the apparatus, the image data including, for said each location in the plurality of locations, one of a first or second desired voltage level; calculating, using the correction data and the image data, respective desired output power levels for a plurality of light emitting diodes (LEDs) in a printbar for the apparatus, aligned with the plurality of locations, to discharge said each location to the one of the first or second desired charge level, the respective desired output power levels selected to compensate for variances of respective induced charge levels at the plurality of locations; and supplying respective power inputs to the plurality of LEDs to generate the respective desired output power levels.

According to aspects illustrated herein, there is provided an image recording apparatus with improved xerographic voltage uniformity, including a memory element and a processor for at least one specially programmed general purpose computer. The memory element is for: storing correction data for a plurality of locations across a width of a photoconductive layer for a photoreceptor for the image recording apparatus, the correction data including respective variances, with respect to a desired induced charge level, of respective actual induced charge levels; and storing respective light output levels, for a plurality of light emitting diodes (LEDs) in a printbar for the apparatus, the plurality of LEDs aligned with the plurality of locations. The processor is for: applying voltage to the photoconductive layer such that the respective actual induced charge levels differ from the desired induced charge level according to the respective variances; receiving image data including respective desired charge levels for the plurality of locations, the respective desired charge levels being one of a second or third charge level; determining, using the stored respective light output levels and the correction and image data, that the respective output power levels for the plurality of LEDs are insufficient to discharge the plurality of locations to be within a first range of the second desired charge level or to be within a second range of the third desired charge level; and modifying, using the correction and image data, power supplied to the plurality of LEDs such that the respective output power levels of the plurality of LEDs are sufficient to discharge the plurality of locations to be within the first range of the second desired charge level or to be within the second range of the third desired charge level.

According to aspects illustrated herein, there is provided a module for an image recording apparatus, including: a photoreceptor with a photoconductive layer; and a memory element for storing correction data for a plurality of locations on the photoconductive layer of the photoreceptor. The module is insertable into and removable from the image recording apparatus. When the module is installed in the apparatus, a processor for at least one specially programmed general purpose computer is for: inducing a charge on the photoconductive layer; receiving image data for producing an image using the apparatus, the image data including, for said each location in the plurality of locations, one of a first or second desired voltage level; calculating, using the correction data and the image data, respective desired output power levels for a plurality of light emitting diodes (LEDs) in a printbar for the apparatus, aligned with the plurality of locations, to discharge said each location to the one of the first or second desired charge level, the respective desired output power levels selected to compensate for variances of respective induced charge levels at the plurality of locations; and supplying respective power inputs to the plurality of LEDs to generate the respective desired output power levels.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Furthermore, as used herein, the words "printer," "printer system", "printing system", "printer device" and "printing device" as used herein encompasses any apparatus, such as a digital copier, bookmaking machine, facsimile machine, multi-function machine, etc. which performs a print outputting function for any purpose.

By "photoconductive layer" we mean an outermost layer of a photoreceptor, positioned over a substrate of the photoreceptor, which holds an induced electrostatic charge. A photoconductive layer acts as an insulator when not exposed to light and acts as a conductor when exposed to light. When the photoreceptor is charged, a positive or negative charge is created on the surface of the photoconductive layer. When the charged surface of the photoconductive layer is exposed to light, the layer acts as a conductor and the positive charge is at least partially discharged or neutralized according to the intensity of the light.

Moreover, although any methods, devices or materials similar or equivalent to those described herein can be used in the practice or testing of these embodiments, some embodiments of methods, devices, and materials are now described.

Figure 2:
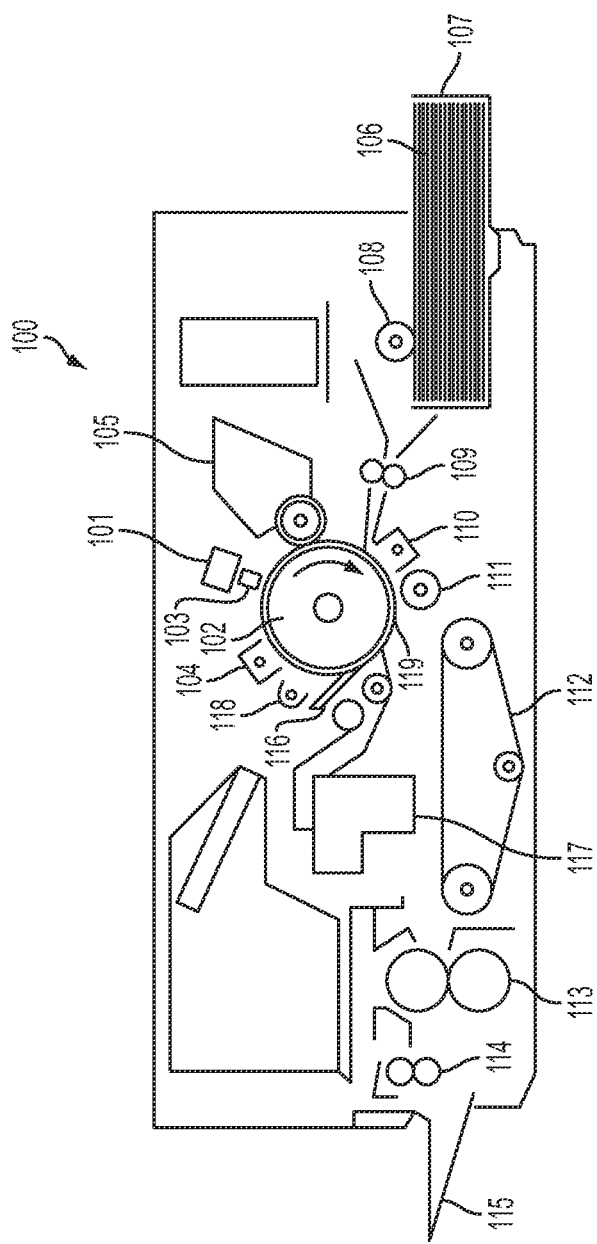
FIG. 2 schematically shows an image recording apparatus with an LED printbar and improved xerographic voltage uniformity.

FIG. 2 schematically shows image recording apparatus 200 with an LED printbar and improved xerographic voltage uniformity.

Figure 1:
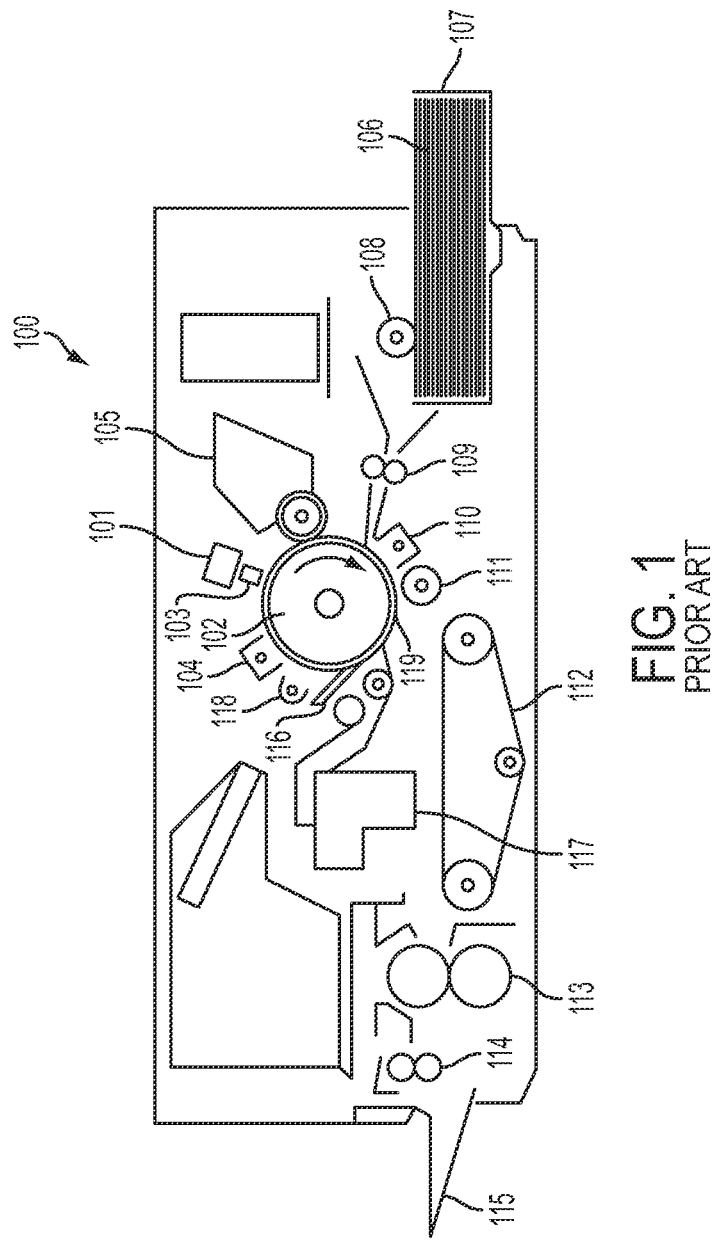
FIG. 1 schematically shows a prior art image recording apparatus with a light-emitting diode (LED) printbar.
Figure 3:
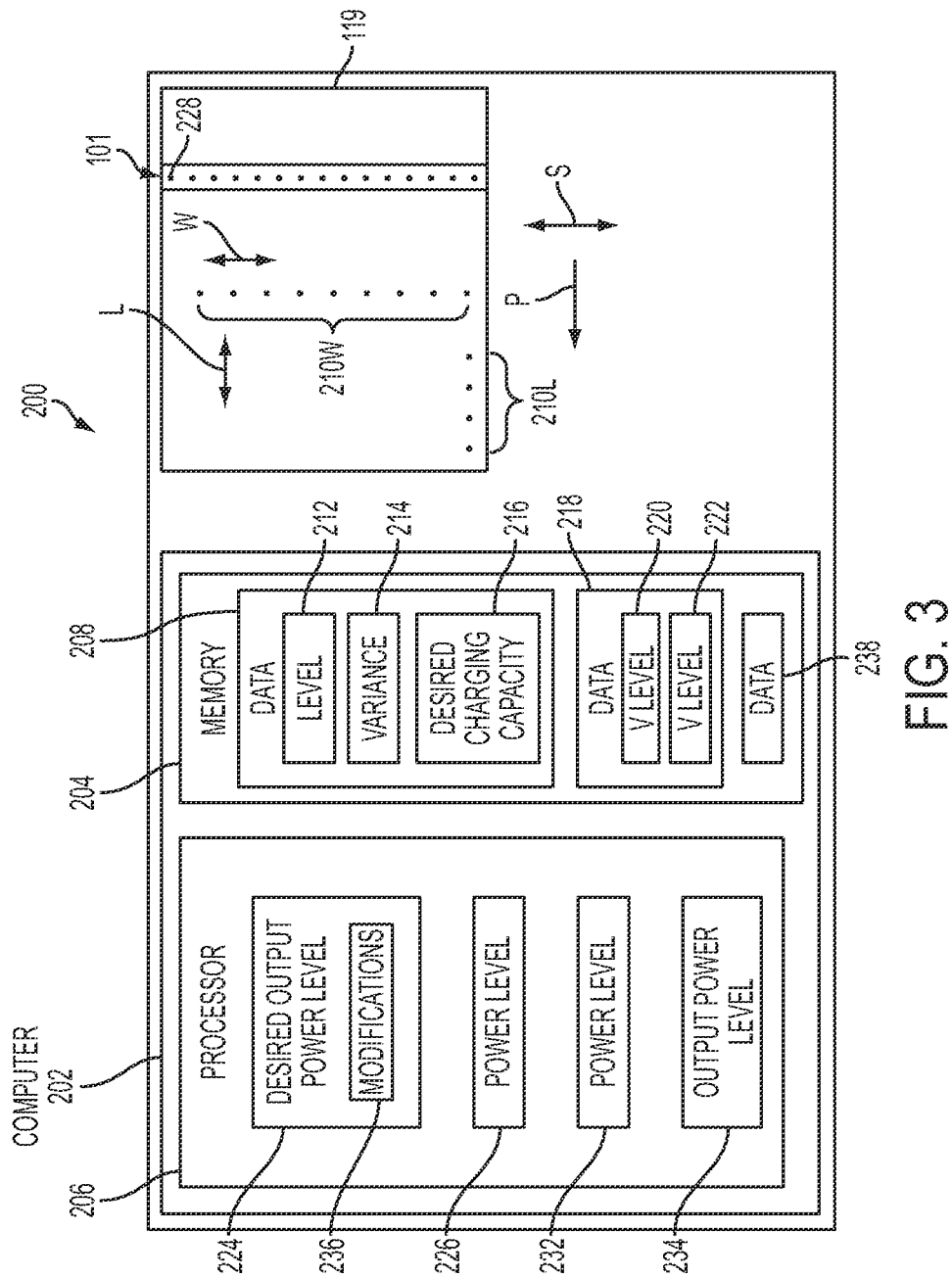
FIG. 3 is a schematic block diagram of the apparatus shown in FIG. 2.

FIG. 3 is a schematic block diagram of apparatus 200 shown in FIG. 2. The following should be viewed in light of FIGS. 2 and 3. Apparatus 200 can be for black and white imaging or for color imaging. The description of the components and operations for apparatus 100 in FIG. 1 are applicable to apparatus 200 except as discussed below. Apparatus 200 differs from apparatus 100 at least by computer 200 and the functions and operations associated with computer 202 as discussed infra. Apparatus 200 includes at least one specially programmed computer 202 with memory element 204 and processor 206. The memory element stores correction data 208 for plurality of locations 210 on the photoreceptor 102, for example on photoconductive layer 119. In an example embodiment, the locations, for example, locations 210W are along width W of the photoreceptor, orthogonal to process direction P for the apparatus. In an example embodiment, the locations, for example, locations 210L are along length L of the photoreceptor, parallel to process direction P. It should be understood that respective example numbers, configurations, and spacings of locations 210 are shown in the figures for purposes of illustration only and that other numbers, configurations, or spacings of locations 210 are possible.

The discussion that follows is directed to the configuration shown in FIG. 2, specifically, to an image recording apparatus with a drum photoreceptor, such as drum 102. However, it should be understood that the discussion is applicable to any photoreceptor configuration known in the art, for example, a belt photoreceptor.

In an example embodiment, data 208 includes actual induced charge levels 212 for locations 210 and variances 214 of actual induced charge levels 212 from desired induced charge level 216 for the photoreceptor. Data 208 can be obtained by any means known in the art. As noted supra, the actual induced charge level of photoconductive layer 119 is dependent upon the thickness of the layer, the orientation of the charger, and the orientation of drum 102. In an example embodiment, as part of the fabrication process for photoreceptor 102, variations in the thickness of the photoconductive layer coating occur across width W, for example, at locations 210W. Using the actual thickness of the photoconductive layer, levels 212 and variances 214 are measured or determined for locations 210.

In an example embodiment, locations 210 are along width W, variances 214 are due to the misalignment of the charger noted supra, and variances 214 are determined by any means known in the art. For example, the photoreceptor is charged in the apparatus, induced charge voltage measurements are taken at locations 210, and the measured charge voltages are compared with desired induced charge level 216 to calculate the variances.

In an example embodiment, locations 210 are along length L, variations 214 are due to the misalignment of drum 102 noted supra, and variances 214 are determined by any means known in the art. For example, the photoreceptor is charged in the apparatus, induced charge voltage measurements are taken at locations 210, and the measured charge voltages are compared with desired induced charge level 216 to calculate the variances. In the discussion that follows, it is assumed that locations 210 are along width W and that respective levels 212 and variances 214 are uniform along length L of the photoreceptor for a particular location along the width of the photoreceptor.

In an example embodiment, as part of an operation to produce an image using apparatus 200, the processor and the charger charge the photoreceptor. In general, the charger supplies a charge voltage according to the desired induced charge level 216, for example, the charging voltage results in photoconductive layer 119 being charged at desired induced charge level 216 when the thickness of the coating on photoconductive layer 119 is equal to the specified thickness noted supra. As noted above, the actual induced charge levels may vary, for example, as recorded in data 208.

The processor receives image data 218 for producing the image. Data 218 includes, for each location 210 and for a scan line in scan direction S, desired voltage level 220 or desired voltage level 222. Voltage levels 220 and 222 are voltage levels to which locations 210 are to be discharged by the LEDs. For example, voltage level 220 is the voltage level for a printed portion of the image and voltage level 222 is the voltage level for a blank portion of the image. In an example embodiment, the voltages at the locations are discharged to within respective ranges of voltage levels 220 or 222.

The processor calculates, using data 208 and 218, desired output power levels 224 for LEDs 226 in the printbar, aligned with locations 210, to discharge each location 210 to voltage level 220 or 222 as specified by data 218. Output power levels 224 are compensated according to variances 214 as further described infra. The processor calculates power levels 226 for power inputs to LEDs 228 to generate output power levels 224. An exemplary number of LEDs 228 are shown for purposes of illustration only. It should be understood that apparatus 200 is not limited to the number of LEDs shown.

In an example embodiment, the processor is for calculating, assuming that locations 210 are charged at desired induced charge level 216, power levels 232 for the power inputs for the LEDs as required to produce output power levels 234 from the plurality of LEDs to discharge locations 210 to one of charge levels 220 or 222. That is, the processor calculates the "base" condition assuming uniform charging of photoconductive layer 119. The processor calculates, using data 208 and 218, modifications 236 to output power levels 224 to discharge locations 210 to one of charge levels 220 or 222 given variances 214. The processor uses modifications 236 to modify power levels 232 to create power levels 226. That is, the processor modifies the "base" power inputs.

In an example embodiment, in the "base" condition apparatus 200 supplies power to the LEDs at one substantially uniform level for locations with voltage level 220 and at another substantially uniform level for locations with voltage level 222. For example, for a location 210 with variance 214 of 25V from a desired induced charge level 216 of 500V, the processor determines an increase in output power for the LED aligned with the location to discharge the additional 25V. The processor calculates an increase to the substantially uniform power level for locations with voltage level 220 or to the substantially uniform power level for locations with voltage level 222 as needed to generate the increase in output power.

Figure 4:
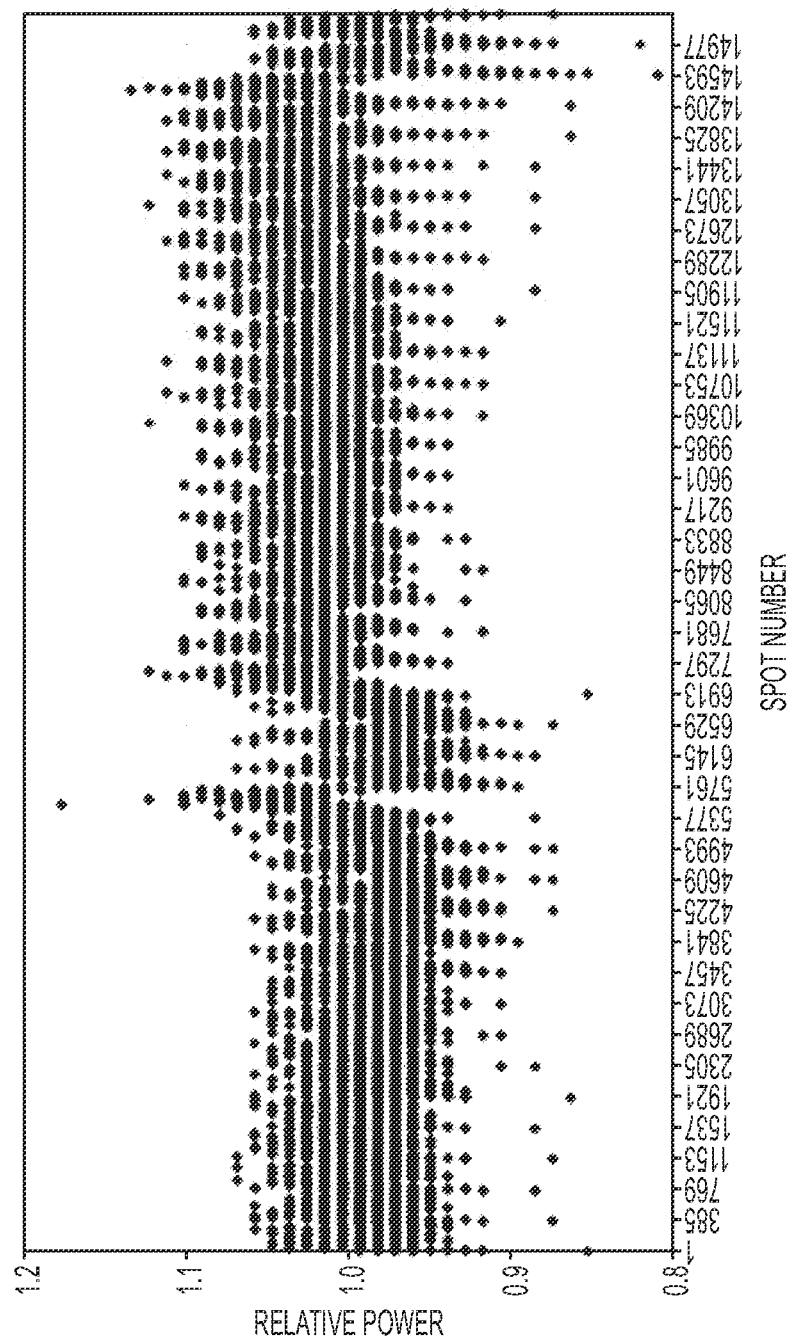
FIG. 4 is a graph illustrating power variability for LEDs in an LED printbar; and, FIG. 5 is a schematic block diagram of the apparatus shown in FIG. 2 with a module.

FIG. 4 is a graph illustrating power variability for LEDs in an LED printbar. The following should be viewed in light of FIGS. 2 through 4. In an example embodiment, using any means known in the art, the memory element stores data 238 regarding variances in the power and light outputs for the LEDs. That is, data 238 includes actual output power levels for the LEDs. Such variances can be caused by the following factors. During early life most LEDs increase in power as they "anneal" and then exponentially drop in time. Thus, for individual LEDs, power will vary with time with an increase initially followed by a long slow degradation. It is commonly understood that the degradation is mainly dependent on the total usage (time×duty cycle) of the LEDS and current level, with some variation from batch to batch due to semiconductor processing. The processor uses data 238 to compensate for variances in the output power of LEDs 228 by modifying power inputs to the LEDs. For example, if data 238 shows that the output power level for a particular LED is less than a certain threshold, processor 206 increases the input power to the LED to boost the output power level to the threshold. The processor uses data 238 to compensate for variances 214 as discussed infra.

In an example, embodiment, the processor calculates, using data 238, power levels 226 for the power inputs to the LEDs as required to produce desired output power levels 234 (the output power levels needed to discharge respective locations 210 given variances 214). That is, rather than making input power corrections assuming a uniform output power level for the LEDs in the plurality of LEDs, the processor uses the actual output power levels for the LEDs as recorded in data 238. For example, voltage level 220 is 500V and is the voltage level for a printed portion of the image, and voltage level 222 is 100V and is the voltage level for a blank portion of the image. Variance 214 for two particular locations 210 is 25V. Thus, the induced charges on the particular locations, prior to being discharged by the LEDs, are 525V. From data 238, the processor determines that the actual output power level of the first LED is sufficient to discharge the first location only to 520V and the actual power level of the second LED is sufficient to discharge the second location only to 515V. Thus, the output power levels of the LEDs must be boosted to properly discharge the locations.

The processor calculates, using data 238, respective output power level increases needed by the two LEDs to discharge the two locations to 500V (the first LED requires a greater increase in output power than the second LED) and calculates the respective modifications to the respective power inputs for the two LEDs needed to generate the respective increases in output power level.

Figure 5:
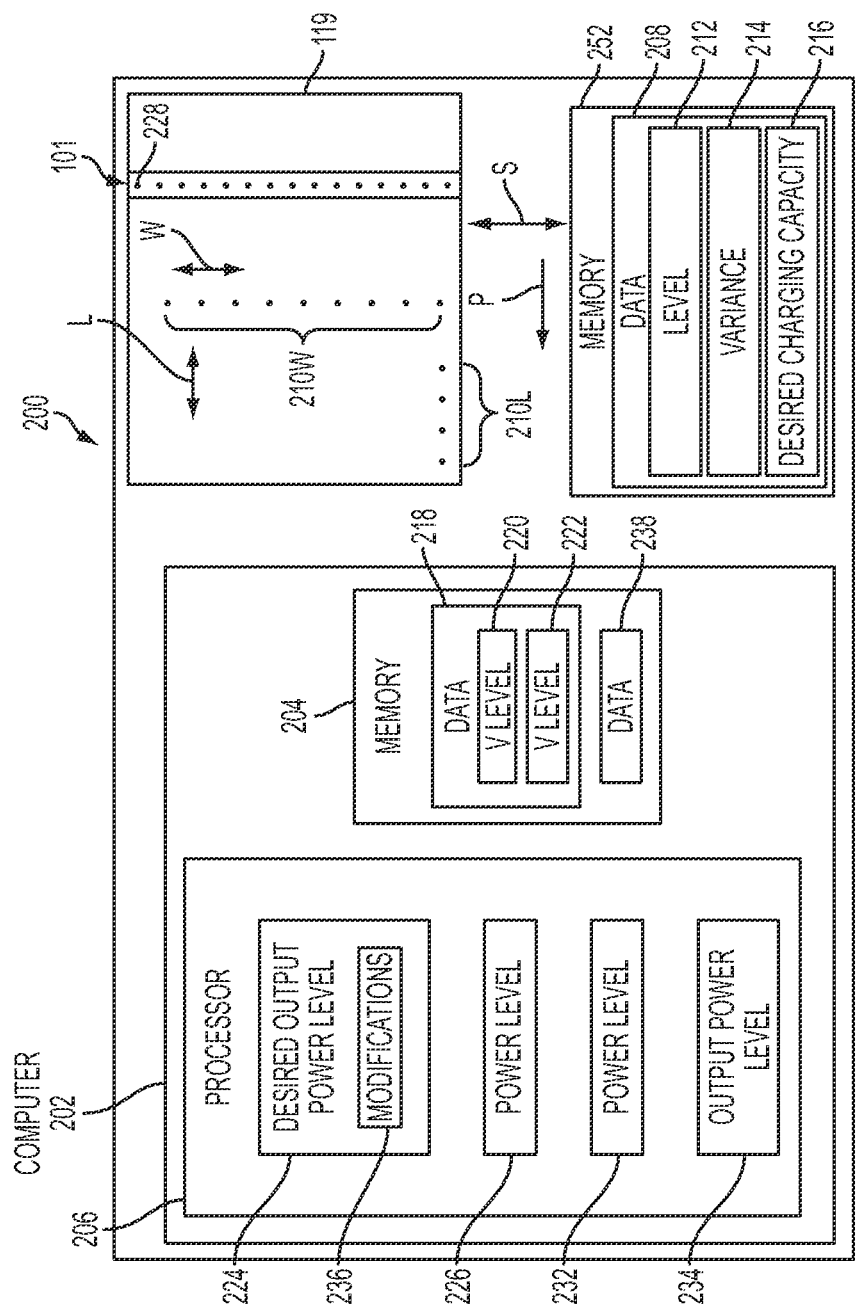

FIG. 5 is a schematic block diagram of the apparatus shown in FIG. 2 with module 250. The respective descriptions for FIGS. 2 and 3 are applicable to FIG. 5 except as noted below. U.S. Pat. No. 7,649,638, the disclosure of which is incorporated herein by reference in its entirety, discloses a customer replaceable unit, or module, including a memory element for storing information regarding operation or characteristics of the module. In an example embodiment, apparatus 200 includes module 250 with memory element 252. In an example embodiment, module 250 includes photoreceptor 119. Module 250 can be installed in or removed from apparatus 200. For example, the module can be installed in a particular apparatus 200 and then removed from the particular apparatus for reinstallation in the same apparatus or for installation in a different apparatus 200. Memory element 252 includes data 208. The discussion supra regarding memory 204, data 208, and photoreceptor 119 is applicable to apparatus 200 with module 250. For example, processor 206 carries out the operations described supra for the processor, for example, operations using data 208, using module 250.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-based method for improving xerographic voltage uniformity in an image recording apparatus, comprising:
   storing, in a memory element for at least one specially programmed general purpose computer, correction data for a plurality of locations on a photoconductive layer of a photoreceptor for the image recording apparatus;
   inducing a charge, using a processor for the at least one specially programmed general purpose computer, on the photoconductive layer;
   receiving, using the processor, image data for producing an image using the apparatus, the image data including, for said each location in the plurality of locations, one of a first or second desired voltage level;

calculating, using the processor, the correction data, and the image data, respective desired output power levels for a plurality of light emitting diodes (LEDs) in a printbar for the apparatus, aligned with the plurality of locations, to discharge said each location to the one of the first or second desired charge level, the respective desired output power levels selected to compensate for variances of respective induced charge levels at the plurality of locations; and, supplying, using the processor, respective power inputs to the plurality of LEDs to generate the respective desired output power levels.

2. The computer-based method of claim 1 wherein the correction data includes, for each location in the plurality of locations, a respective variance, with respect to a desired induced charge level for the photoconductive layer, of a respective actual induced charge level.

3. The computer-based method of claim 1 wherein:
the first desired charge level is for a print area for the image; and,
the second desired charge level is for a blank area for the image.

4. The computer-based method of claim 1 wherein:
the plurality of locations on the photoreceptor is across a width, orthogonal to a process direction, of the photosensor; or,
the plurality of locations on the photoreceptor is along a length, parallel to a process direction, of the photosensor.

5. The computer-based method of claim 1 wherein a thickness of the photoconductive coating is different at said each location.

6. A computer-based method for improving xerographic voltage uniformity in an image recording apparatus, comprising:
storing, in a memory element for at least one specially programmed general purpose computer, correction data for a plurality of locations across a width of a photoconductive layer for a photoreceptor for the image recording apparatus, the correction data including respective variances, with respect to a desired induced charge level, of respective actual induced charge levels;
applying, using a processor for the at least one specially programmed general purpose computer, voltage to the photoconductive layer such that the respective actual induced charge levels differ from the desired induced charge level according to the respective variances;
receiving, using the processor, image data including respective desired charge levels for the plurality of locations, the respective desired charge levels being one of a second or third charge level;
storing, in the memory element, respective output power levels for a plurality of light emitting diodes (LEDs) in a printbar for the apparatus, the plurality of LEDs aligned with the plurality of locations;
determining, using the processor, the stored respective output power levels, and the correction and image data, that the respective output power levels for the plurality of LEDs are insufficient to discharge the plurality of locations to be within a first range of the second desired charge level or to be within a second range of the third desired charge level; and,
modifying, using the processor and the correction and image data, power supplied to the plurality of LEDs such that the respective output power levels of the plurality of LEDs are sufficient to discharge the plurality of locations to be within the first range of the second desired charge level or to be within the second range of the third desired charge level.

7. The computer-based method of claim 6 wherein:
the first desired charge level is for a print area for the image; and,
the second desired charge level is for a blank area for the image.

8. The computer-based method of claim 6 wherein a thickness of the photoconductive coating is different at each location in the plurality of locations.

9. A computer-based method for improving xerographic voltage uniformity using a module installable in and removable from an image recording apparatus, comprising:
storing, in a memory element for the module, correction data for a plurality of locations on a photoconductive layer of a photoreceptor included in the module;
installing the module in the image recording apparatus;
inducing a charge, using a processor for at least one specially programmed general purpose computer, on the photoconductive layer;
receiving, using the processor, image data for producing an image using the apparatus, the image data including, for said each location in the plurality of locations, one of a first or second desired voltage level;
calculating, using the processor, the correction data, and the image data, respective desired output power levels for a plurality of light emitting diodes (LEDs) in a printbar for the apparatus, aligned with the plurality of locations, to discharge said each location to the one of the first or second desired charge level, the respective desired output power levels selected to compensate for variances of respective induced charge levels at the plurality of locations; and,
supplying, using the processor, respective power inputs to the plurality of LEDs to generate the respective desired output power levels.

10. The computer-based method of claim 9 wherein the correction data includes, for each location in the plurality of locations, a respective variance, with respect to a desired induced charge level for the photoconductive layer, of a respective actual induced charge level.

11. The computer-based method of claim 9 wherein:
the first desired charge level is for a print area for the image; and,
the second desired charge level is for a blank area for the image.

12. The computer-based method of claim 9 wherein:
the plurality of locations on the photoreceptor is across a width, orthogonal to a process direction, of the photosensor; or,
the plurality of locations on the photoreceptor is along a length, parallel to a process direction, of the photosensor.

13. The computer-based method of claim 9 wherein a thickness of the photoconductive coating is different at said each location.

14. An image recording apparatus with improved xerographic voltage uniformity, comprising:
a memory element for at least one specially programmed general purpose computer for storing correction data for a plurality of locations on a photoconductive layer of a photoreceptor for the image recording apparatus; and,
a processor for the at least one specially programmed general purpose computer for:
inducing a charge on the photoconductive layer;

receiving image data for producing an image using the apparatus, the image data including, for said each location in the plurality of locations, one of a first or second desired voltage level;

calculating, using the correction data and the image data, respective desired output power levels for a plurality of light emitting diodes (LEDs) in a printbar for the apparatus, aligned with the plurality of locations, to discharge said each location to the one of the first or second desired charge level, the respective desired output power levels selected to compensate for variances of respective induced charge levels at the plurality of locations; and, supplying respective power inputs to the plurality of LEDs to generate the respective desired output power levels.

15. The apparatus of claim 14 wherein the correction data includes, for each location in the plurality of locations, a respective variance, with respect to a desired induced charge level for the photoconductive layer, of a respective actual induced charge level.

16. The apparatus of claim 14, wherein:
the first desired charge level is for a print area for the image; and,
the second desired charge level is for a blank area for the image.

17. The computer-based method of claim 14 wherein:
the plurality of locations on the photoreceptor is across a width, orthogonal to a process direction, of the photosensor; or,
the plurality of locations on the photoreceptor is along a length, parallel to a process direction, of the photosensor.

18. The computer-based method of claim 14 wherein a thickness of the photoconductive coating is different at said each location.

19. An image recording apparatus with improved xerographic voltage uniformity, comprising:
a memory element for at least one specially programmed general purpose computer for:
storing correction data for a plurality of locations across a width of a photoconductive layer for a photoreceptor for the image recording apparatus, the correction data including respective variances, with respect to a desired induced charge level, of respective actual induced charge levels; and,
storing respective output power levels, for a plurality of light emitting diodes (LEDs) in a printbar for the apparatus, the plurality of LEDs aligned with the plurality of locations; and,
a processor for the at least one specially programmed computer for:
applying voltage to the photoconductive layer such that the respective actual induced charge levels differ from the desired induced charge level according to the respective variances;
receiving image data including respective desired charge levels for the plurality of locations, the respective desired charge levels being one of a second or third charge level;
determining, using the stored respective output power levels and the correction and image data, that the respective output power levels for the plurality of LEDs are insufficient to discharge the plurality of locations to be within a first range of the second desired charge level or to be within a second range of the third desired charge level; and,
modifying, using the correction and image data, power supplied to the plurality of LEDs such that the respective output power levels of the plurality of LEDs are sufficient to discharge the plurality of locations to be within the first range of the second desired charge level or to be within the second range of the third desired charge level.

20. The apparatus of claim 19, wherein:
the first desired charge level is for a print area for the image; and,
the second desired charge level is for a blank area for the image.

21. The apparatus of claim 19 wherein a thickness of the photoconductive coating is different at each location in the plurality of locations.

22. A module for an image recording apparatus, comprising:
a photoreceptor with a photoconductive layer; and,
a memory element for storing correction data for a plurality of locations on the photoconductive layer of the photoreceptor, wherein:
the module is insertable into and removable from the image recording apparatus; and,
when the module is installed in the image recording apparatus, a processor for at least one specially programmed general purpose computer is for:
inducing a charge on the photoconductive layer;
receiving image data for producing an image using the apparatus, the image data including, for said each location in the plurality of locations, one of a first or second desired voltage level;
calculating, using the correction data and the image data, respective desired output power levels for a plurality of light emitting diodes (LEDs) in a printbar for the apparatus, aligned with the plurality of locations, to discharge said each location to the one of the first or second desired charge level, the respective desired output power levels selected to compensate for variances of respective induced charge levels at the plurality of locations; and,
supplying respective power inputs to the plurality of LEDs to generate the respective desired output power levels.

23. The apparatus of claim 22 wherein the correction data includes, for each location in the plurality of locations, a respective variance, with respect to a desired induced charge level for the photoconductive layer, of a respective actual induced charge level.

24. The apparatus of claim 22, wherein:
the first desired charge level is for a print area for the image; and,
the second desired charge level is for a blank area for the image.

25. The computer-based method of claim 22 wherein:
the plurality of locations on the photoreceptor is across a width, orthogonal to a process direction, of the photosensor; or,
the plurality of locations on the photoreceptor is along a length, parallel to a process direction, of the photosensor.

26. The computer-based method of claim 22 wherein a thickness of the photoconductive coating is different at said each location.

* * * * *